(12) United States Patent
Happenhofer et al.

(10) Patent No.: US 6,820,588 B2
(45) Date of Patent: Nov. 23, 2004

(54) METHOD FOR CONTROLLING AN INTERNAL COMBUSTION ENGINE

(75) Inventors: Werner Happenhofer, Wackersdorf (DE); Hong Zhang, Tegernheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/451,847

(22) PCT Filed: Dec. 20, 2001

(86) PCT No.: PCT/DE01/04869
§ 371 (c)(1),
(2), (4) Date: Jun. 26, 2003

(87) PCT Pub. No.: WO02/052137
PCT Pub. Date: Jul. 4, 2002

(65) Prior Publication Data
US 2004/0050360 A1 Mar. 18, 2004

(30) Foreign Application Priority Data
Dec. 27, 2000 (DE) .......................... 100 65 436

(51) Int. Cl.⁷ ................................. F02B 3/10
(52) U.S. Cl. .................. 123/299; 701/104; 701/105
(58) Field of Search ................ 123/299, 300; 701/104, 105

(56) References Cited
U.S. PATENT DOCUMENTS 4,971,011 A    11/1990   Nanyoshi et al.
5,365,902 A *  11/1994   Hsu ........................... 123/299
6,536,414 B2 *  3/2003   Hasegawa et al. .......... 701/104
2002/0162529 A1 * 11/2002 Hasegawa .................... 123/299

FOREIGN PATENT DOCUMENTS

| DE | 196 12 455 A1 | 10/1997 |
| DE | 196 18 849 A1 | 11/1997 |
| DE | 197 12 143 A1 | 9/1998 |
| EP | 0570 986 A2 | 11/1993 |
| EP | 0937 884 A2 | 8/1999 |
| WO | WO 97/36762 A1 | 10/1997 |

* cited by examiner

Primary Examiner—Erick Solis
(74) Attorney, Agent, or Firm—Morrison & Foerster LLP.

(57) ABSTRACT

The invention relates to a method for controlling an internal combustion engine with a fuel injection system which can comprise, in addition to a main injection quantity, an additional amount of pre-injected and/or post-injected fuel for each injection pulse for each combustion chamber for each combustion cycle at a given injection time. A theoretical torque is determined from an accelerator pedal value, rotational speed and air or fuel mass flow while taking into account a factor from a family of characteristics. According to the invention, the calculated theoretical torque is corrected in the case of a pre-injected or post-injected fuel mass flow by taking into account, in a correction factor, a value for a time or phase difference of the amount of pre-injected or post-injected fuel and the main injection quantity for each cycle.

10 Claims, 3 Drawing Sheets

METHOD FOR CONTROLLING AN INTERNAL COMBUSTION ENGINE

CLAIM FOR PRIORITY

This application claims priority to International Application No. PCT/DE01/04869 which was published in the German language on Jul. 4, 2002.

TECHNICAL FIELD OF THE INVENTION

The invention relates to a method for controlling an internal combustion engine.

BACKGROUND OF THE INVENTION

International publication WO 97/36762 discloses a method for controlling a four-stroke internal combustion engine, in which method a desired torque for an internal combustion engine is calculated from a maximum value and a minimum value for an engine torque and from a weighting factor. The weighting factor—also designated as the torque factor—is derived from an accelerator pedal setting and a current rotational speed of the internal combustion engine. The values for the maximum and minimum torque are determined depending on the rotational speed, a torque loss and further operating variables. The torque loss is in turn calculated from the rotational speed and the aforementioned operating variables.

In the case of so-called lean-running internal combustion engines, it is now conventional to introduce a small quantity of fuel into the combustion chamber as a so-called pre-injection, in order to produce the most homogeneous mixture possible in the whole of the combustion chamber, particularly in the case of so-called stratified charge operation, the mixture burning reliably and completely during the working stroke. It has also become conventional to introduce a small quantity of fuel, the so-called post-injection, into the combustion chamber when the exhaust valves are already open. This post-injected quantity of fuel then burns in the exhaust manifold and causes a significant increase in temperature of the emitted combustion exhaust gases. A catalytic converter which is located in the exhaust train should thus be brought more quickly to its required operating temperature for optimum purification effect, particularly in a start phase of the internal combustion engine.

In the known method for controlling internal combustion engines by determining torques, it has not previously been possible fully to take into consideration these additional injection pulses in the relevant working strokes of the four-stroke internal combustion engine.

SUMMARY OF THE INVENTION

The invention discloses a reliable determination of the torque of an internal combustion engine in which a plurality of injection pulses take place during each working stroke of the internal combustion engine.

In accordance with one embodiment of the invention, there is a method for controlling an internal combustion engine takes both a pre-injected and a post-injected quantity into consideration when calculating a current torque, by introducing an additional factor in each case. Depending on the phase position of the pre-injection or post-injection to the main injection, the factor is multiplied by the current torque for the main injection, and therefore reflects the effect of these additionally injected fuel quantities on the combustion pressure and therefore on the engine torque.

In another embodiment according to the invention, there is a method for controlling an internal combustion engine which has a fuel injection system, in which each fuel injection pulse for a combustion chamber during a working stroke can include at least one additional quantity of pre-injected and/or at least one additional quantity of post-injected fuel in addition to a main injection quantity at the intended injection instant, provision is made for including at least the following components in a control system which is assigned to the internal combustion engine: a pedal value sensor for capturing a current accelerator pedal value and a rotational speed sensor for capturing a current rotational speed of the internal combustion engine. Provision is also made for determining a preferred torque for the clutch-side end of a crankshaft, based on the accelerator pedal value and on the rotational speed, and for deriving from the preferred torque at least one actuating signal for at least one actuator of the internal combustion engine. Such an actuating signal can preferably be a throttle valve servomotor or similar.

In accordance with another embodiment of the invention, in the case of a pre-injected fuel mass which is supplied to the combustion chamber at an earlier instant than a main-injection mass, a correction to the torque-determining total fuel mass is carried out, wherein a value for a time or phase difference between injection start or injection end of the pre-injection and injection start or injection end of the main injection is taken into consideration in an assigned correction factor. Accordingly, in the case of a post-injected fuel mass which is supplied to the combustion chamber at a later instant than the main-injection mass, a correction to the torque-determining total fuel mass is likewise carried out, wherein a value for a time or phase difference between injection start or injection end of the main injection and injection start or injection end of the post-injection is taken into consideration in an assigned correction factor. The correction factor typically takes into consideration the injection start of the different injection pulses in each case. However, it is also possible to take into consideration, for example, the injection end of the pre-injection and the injection start of the main injection.

In a preferred embodiment of the invention, provision is made for additionally capturing a current value for the air mass flow in the control system which is assigned to the internal combustion engine. Since a fuel mass flow has not previously been directly measured in conventional systems, the current value for the fuel mass flow, which represents a relevant measurement variable for the method, is derived from the air mass flow, with reference to a characteristic map if applicable.

In addition to the driver preference, which is derived from the current position of the accelerator pedal, known control methods include further torque-determining or torque-requiring influence variables. Such an influence variable can be, for example, a torque requirement of a travel speed regulator which is known per se, or a torque requirement of an anti-slip regulator (ASR) which is known per se. An ASR system typically includes the capture of a current wheel rotational speed and a comparison with an actual speed of the vehicle. In the case of significant variations, a reduction of a desired torque is generated, together with a braking intervention on the individual wheel if applicable. A further torque requirement can be generated, for example, by a so-called ESP system ('electronic stability program'). These torque-determining influence variables are preferably taken into consideration by means of assignment rules from characteristic maps.

In another preferred embodiment in accordance with the invention, an overall ratio of air and fuel per working stroke is taken into consideration for the correction of the determined total fuel mass. When calculating a current torque, consideration is preferably given to a correction factor which comprises the sum of at least two of three factors $F_1$, $F_2$ and $F_3$. In this case, the first factor $F_1$ is a function of the fuel mass supplied in the main injection: $F_1=f_1(m_{fuel,main})$; the second factor $F_2$ is a function from the factor of the fuel mass supplied in the pre-injection and of a first efficiency level $\eta_2$, which depends on the time separation between pre-injection and main injection: $F_2=f_2(m_{fuel,pre})*\eta_2(phase_{pre-main})$, expressed here by the term 'phase'. This phase can be a time-related variable or express an angular relationship which specifies an angular difference in degrees between pre-injection and main injection. The third factor $F_3$ is finally a function from the factor of the fuel mass which is supplied in the post-injection and of an efficiency level $\eta_3$, which depends on the time separation between main injection and post-injection: $F_3=f_3(m_{fuel,post})*\eta_3(phase_{main-post})$. In summary, it follows that:

$$F_{eff}=f_1(m_{fuel,main})+f_2(m_{fuel,pre})*\eta_2(phase_{pre-main})+f_3(m_{fuel,post})*\eta_3(phase_{main-post}).$$

In still another preferred embodiment in accordance with the invention, the remaining oxygen share $\lambda$ in the exhaust gas can also be considered in the efficiency levels $\eta_2$ and $\eta_3$ for calculating the torque, with the result that the relationship is extended as follows:

$$F_{eff}=f_1(m_{fuel,main})+f_2(m_{fuel,pre})*\eta_2(phase_{pre-main},\lambda)+f_3(m_{fuel,post})*\eta_3(phase_{main-post},\lambda)$$

BRIEF DESCRIPTION OF THE DRAWINGS

The invention is explained in greater detail below, with reference to preferred exemplary embodiments and to the drawings, in which.

DETAILED DESCRIPTION OF THE INVENTION

In the following descriptions of the figures, identical parts are generally assigned identical reference signs. It is the case for all block schematic diagrams, that the input variables are totalized at summing points and that the output variable represents the sum of the input variables. It is also the case for all block schematic diagrams, that all input variables are multiplied at the multiplication points and that the output variable of each multiplication point represents the product of the input variables.

Figure 1:
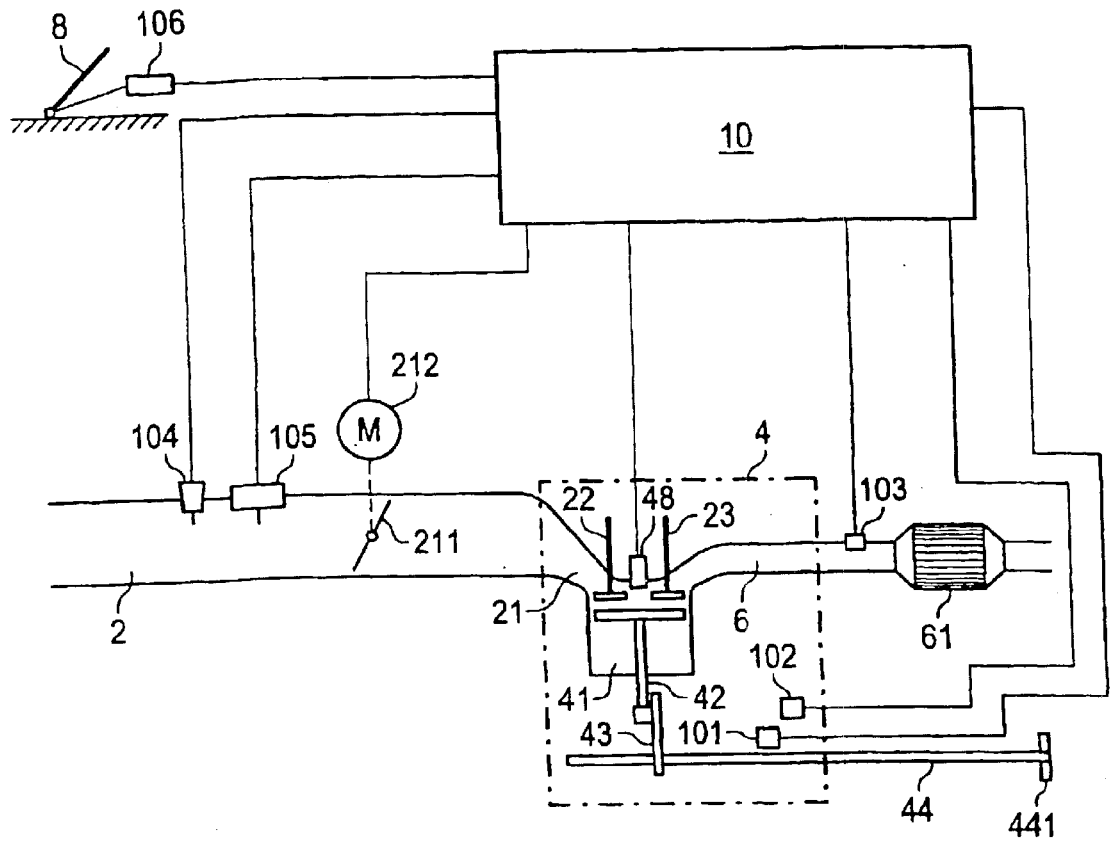
FIG. 1 shows a schematic skeleton diagram of an internal combustion engine, in which the method in accordance with the invention is applied.

FIG. 1 is a schematic skeleton diagram showing an internal combustion engine, e.g. for a motor vehicle, in which the method in accordance with the invention is applied. The internal combustion engine 4 has an intake channel 2, an exhaust channel 6, and a central processing and control unit 10 in which the method in accordance with the invention is applied, as well as other components. The intake channel 2 flows into an inlet port 21, at the mouth of which an inlet valve 22 is provided in a combustion chamber 41. Only one combustion chamber 41 of the internal combustion engine 4 is illustrated for better clarity. A longitudinally moveable piston 42 is arranged in the combustion chamber 41, said piston being connected to a crankshaft 44 by means of a connecting rod 43. A rotational speed sensor 101 is arranged in the internal combustion engine 4 in such a way that it can capture the rotational speed of the crankshaft 44.

At one free end of the crankshaft 44 is coupling flange 441 at which a clutch (not illustrated) or a torque converter of an automatic transmission (not illustrated) can be located. The free end is subsequently alternatively designated as the clutch-side end. The term clutch 441 is subsequently used to designate the coupling flange 441 and the clutch together.

An injection device 48 projects into the combustion chamber 41 of the internal combustion engine 4, and can be arranged in the center of the head of the combustion chamber 41 as an injection nozzle, for example. This injection device 48 is in a position to inject fuel into the combustion chamber in one or more injection pulses at every working stroke of the internal combustion engine 4. The largest quantity of fuel is introduced into the combustion chamber 41 during a main injection. This main injection is primarily responsible for the combustion pressure on the piston 42 and therefore for the engine torque. A pre-injection and a post-injection, wherein relatively small amounts of additional fuel are injected in each case, contribute comparatively little to the engine torque.

Also projecting into the combustion chamber 41 of the internal combustion engine 4 is an igniter (not illustrated here), for example in the form of a so-called sparking plug which is known per se, the electrodes of which igniter are located centrally in the upper face of the combustion chamber 41 in the skeleton diagram. Alternatively, a plurality of igniters can be provided in each combustion chamber, thereby ensuring a controlled ignition of ignitable air-fuel mixture simultaneously at a plurality of locations. An outlet valve 23 is arranged at an outlet of the combustion chamber 41. The internal combustion engine 4 also has an oil temperature sensor 102, which is attached at a suitable place and is used to capture an engine temperature. Also arranged in the exhaust channel 6 is a so-called lambda sensor 103, for measuring the remaining oxygen share in the exhaust gas, and a catalytic converter 61.

An air temperature sensor 104 and an air mass sensor 105 are located in the intake channel 2 and up-flow of a throttle valve 211. An electromechanical actuator—subsequently designated as a throttle valve adjuster 212—acts on the throttle valve 211 and determines its degree of opening. A pedal value sensor 106 captures a position of an accelerator pedal 8 which allows the driver to specify a current driver preference.

The central processing and control unit 10 is linked via electrical connections to sensors and servomechanisms, which are assigned to actuators in each case. Sensors include the rotational speed sensor 101, the oil temperature sensor 102, the lambda sensor 103, the air temperature sensor 104, the air mass sensor 105 and the pedal value sensor 106, for example. However, sensors other than those illustrated in FIG. 1 may also be present if applicable. For example, an induction manifold pressure sensor may also be present, in which case the air mass meter 12 could be omitted if applicable. A temperature sensor for capturing the coolant temperature could also be provided, for example. The sensors capture the operating variables of the internal combustion engine 4. The measurement signals of the sensors represent input variables for the central processing and control unit 10.

Actuating systems include a servomechanism and an actuator in each case. The servomechanism is an electromotive driving mechanism, an electromotive driven mechanism, a mechanical driving mechanism or another driving mechanism which is known to a person skilled in the art. The actuators take the form of a throttle valve 211, an injection device 48, an igniter 46, a switching unit between two different induction manifold sections (not illustrated), or a device (not illustrated) for adjusting the course of stroke, the start of stroke or the end of stroke of an engine valve. The relevant actuator will subsequently be used to refer to the actuating systems in each case.

The output variables of the central processing and control unit 10 correspond to the control signals for the actuators. Depending on the supplied input variables, the central processing and control unit 10 generates control signals for the actuators in accordance with its programs.

Figure 2:
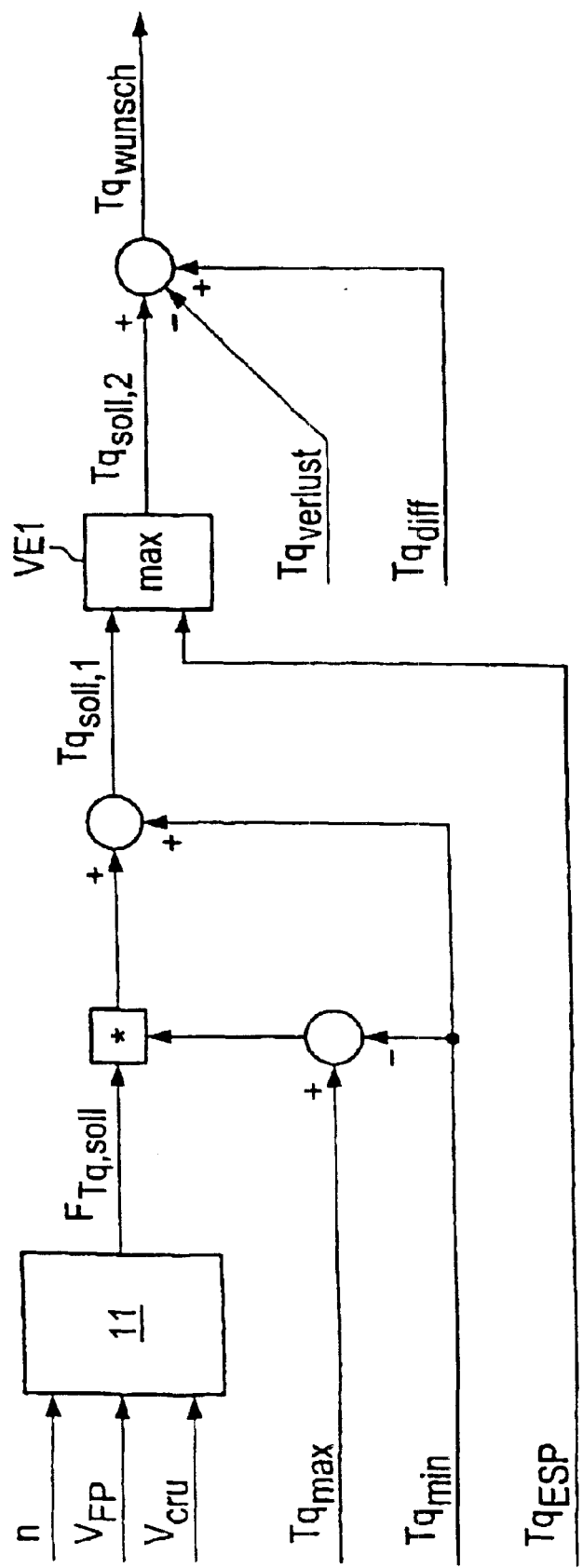
FIG. 2 shows a block schematic diagram of the method in accordance with the invention, to illustrate the determination of a preferred torque.

The block schematic diagram in FIG. 2 shows the method in accordance with the invention for controlling the internal combustion engine. This illustrates how a preferred torque $Tq_{preferred}$ is calculated from different input variables, the preferred torque corresponding to a current driver preference which is transferred by the driver to the central processing and control unit 10 by means of the position of the accelerator pedal 8 which is transferred via the pedal value sensor 106. In a control block 11 of the central processing and control unit 10, a torque factor $F_{Tq,desired}$ is generated depending on a pedal value $V_{FP}$ of the pedal value sensor 106, a rotational speed n of the crankshaft 44, and a regulating value $V_{cru}$ of a travel speed regulator which is known per se. The torque factor $F_{Tq,desired}$ represents a dimensionless variable with a value range between 0 and 1. In addition to the three input variables mentioned above ($V_{FP}$, n, $V_{cru}$), further torque-influencing input variables, e.g. a control signal of a drive slip regulator which is known per se or of a so-called ESP system, can be considered and processed in the control block 11 if applicable.

Like all other variables, a maximum torque $Tq_{max}$ represents a calculation variable in the block schematic diagrams. The maximum torque $Tq_{max}$ corresponds to the maximum torque which can be provided at the clutch 441 of the internal combustion engine. A minimum torque $Tq_{min}$ which can be provided at the clutch 441 of the internal combustion engine can be used to brake the vehicle provided it is a negative value. The maximum torque $Tq_{max}$ and the negative minimum torque $Tq_{min}$ are totalized and the resulting sum signal is multiplied by the torque factor $F_{Tq,desired}$. The minimum torque $Tq_{min}$ is then added to the resulting output signal. The resulting output variable forms a first desired torque $Tq_{desired,1}$.

This first desired torque $Tq_{desired,1}$ is compared in a subsequent first comparison unit CU1 with various other values which represent an alternative torque preference. Only one torque preference $Tq_{ESP}$ from a so-called ESP ('electronic stability program') system has been drawn in FIG. 2 to exemplify such a variable. Further input variables are nonetheless conceivable, being supplied to the first comparison unit CU1, and from which the maximum value in each case would be used to form the output signal, a second desired torque $Tq_{desired,2}$. Such an input variable is, for example, a signal of a so-called ASR (anti-slip regulator) system. In a subsequent summing point, a torque loss $Tq_{loss}$ is subtracted from and a difference torque $Tq_{diff}$ (defined in greater detail below) is added to the output signal for the second desired torque $Tq_{desired,2}$. The resulting sum signal finally forms a preferred torque $Tq_{preferred}$, which represents a current driver preference, complemented by preferred variables from driver assistance systems if applicable. This preferred torque $Tq_{preferred}$ can then be used to generate an air mass desired value or a corresponding control signal for the throttle valve adjuster 212 and for the injection device 48, preferably by means of characteristic maps and depending on the current engine rotational speed n.

Figure 3:
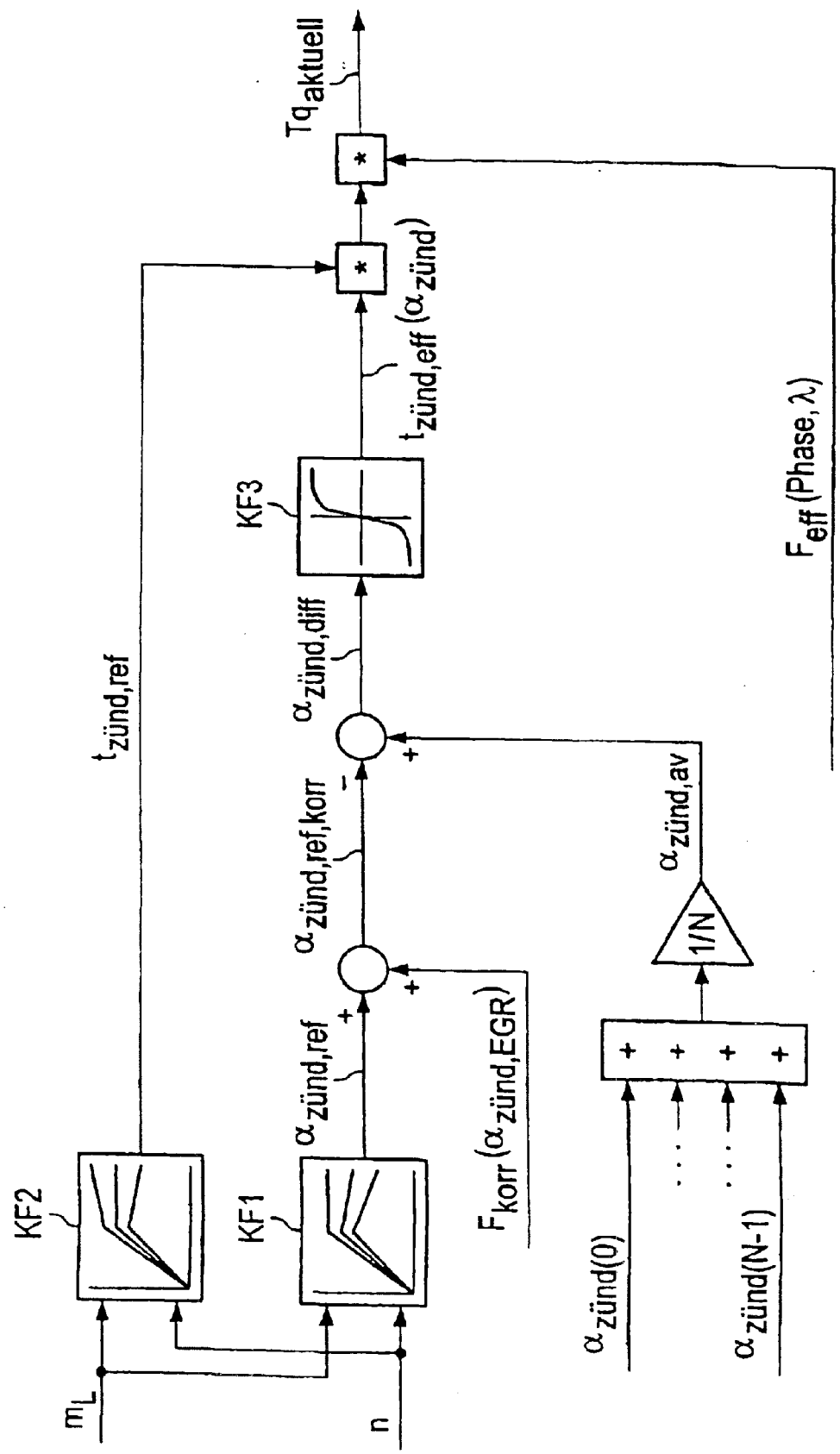
FIG. 3 shows a block schematic diagram to illustrate the determination of a current torque.

The block schematic diagram in FIG. 3 illustrates how a current torque $Tq_{current}$, which can be compared subsequently with the relevant preferred torque $Tq_{preferred}$, is determined from various input variables. A reference ignition angle $\alpha_{ign,ref}$ is assigned in a characteristic map CM1 to the engine rotational speed n and to a value measured by the air mass sensor 105 (cf. FIG. 1) for an air mass mL which is transported within a predetermined time unit, and is added in a subsequent summing point to a correction factor for the ignition angle $F_{corr}(\alpha_{ign,EGR})$, the correction factor resulting from the control of an exhaust gas return (EGR). The total from this summing point forms the corrected reference ignition angle $\alpha_{ign,ref,corr}$. The sum of an ignition angle at an instant zero $\alpha_{ign}(0)$ and further values for the ignition angle for previous combustion cycles, extending back to a value for the ignition angle at the (N−1)th combustion cycle $\alpha_{ign}(N-1)$, is then divided by the number N of cycles taken into consideration, to generate an average value $\alpha_{ign,av}$ for the ignition angle. This average value air $\alpha_{ign,av}$ for the ignition angle of the N last combustion cycles is added in a summing point to the negative corrected reference ignition $\text{angle}_{ign,ref,corr}$, and the difference—the difference ignition angle $\alpha_{ign,ref,corr}$—is supplied to a characteristic map CM3. A specific value for an effective ignition instant $t_{ign,eff}(\alpha_{ign})$ is assigned in the characteristic map CM3 to each value for the difference ignition angle $t_{ign,ref,corr}$.

In addition, a reference ignition instant $t_{ign,ref}$ is assigned in a characteristic map CM2 to the engine rotational speed n and to the value for the air mass $m_L$, and then multiplied by the effective ignition instant $t_{ign,eff}\alpha(_{ign})$. The output signal of this multiplication point is then multiplied by a dimensionless factor $F_{eff}(\text{phase},\lambda)$ in order to arrive at the current torque $Tq_{current}$. This dimensionless factor $F_{eff}(\text{phase},\lambda)$ is used in each case to take into consideration small quantities of pre-injected and post-injected fuel, together with their injection instants and their contributions to the air-fuel ratio $\lambda$ if applicable. The consideration of the air-fuel ratio $\lambda$—the remaining oxygen share in the exhaust gas is measured in this context—is however only optional, and is not mandatory for the function of the control. In this case, the factor $F_{eff}(\text{phase})$ would be dependent only on the phase length of the pre-injection and main injection or of the main injection and post-injection to each other.

The factor $F_{eff}(\text{phase},\lambda)$ or $F_{eff}(\text{phase})$ is typically comprised of the sum of the following three components:

$$F_{eff}=F_1=F_2+F_3$$

where the first factor $F_1$ is a function of the fuel mass $m_{fuel,main}$ injected during the main pulse:

$$F_1=f_1(m_{fuel,min}).$$

The second factor $F_2$ is formed from a function from the mass of pre-injected fuel $m_{fuel,pre}$ and an efficiency level $\eta_2$ which depends on the phase difference between pre-injection pulse and main injection pulse (e.g. in angular degrees or in milliseconds) and/or on the remaining oxygen share A in the exhaust gas:

$$F_2=f_2\,(m_{fuel,pre})*\eta_2(\text{phase}_{pre-main},\lambda)$$

The third factor $F_3$ is formed from a function from the mass of post-injected fuel $m_{fuel,post}$ and an efficiency level $\eta_3$ which depends on the phase difference between main injection pulse and post-injection pulse (e.g. in angular degrees or in milliseconds) and/or on the remaining oxygen share A in the exhaust gas:

$$F_3=f_3(m_{fuel,post})\cdot\eta_3(\text{phase}_{main-post},\lambda).$$

The output of these further multiplication points finally forms the current torque $Tq_{current}$.

Figure 4:
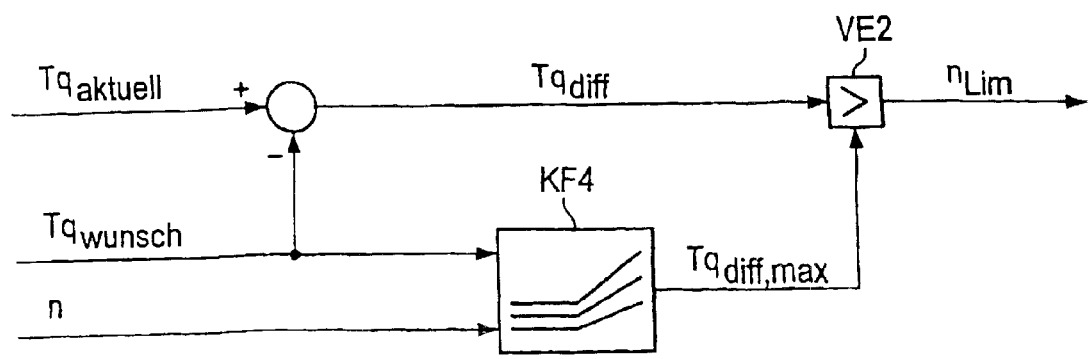
FIG. 4 shows a block schematic diagram in which the current torque and the preferred torque are compared.

With reference to the block schematic diagram in FIG. 4, it is shown how a limit value $n_{Lim}$ is calculated from the comparison of the current torque $Tq_{current}$ (cf. FIG. 3) and the preferred torque $Tq_{preferred}$ (cf. FIG. 2). In this case, a difference torque $Tq_{diff}$ is generated from the current torque $Tq_{current}$ and the negative preferred torque $Tq_{preferred}$. A maximum difference torque $Tq_{diff,max}$ is also generated in a characteristic map CM4 from the preferred torque $Tq_{preferred}$ and the current engine rotational speed n. A maximum value for the maximum permitted rotational speed $n_{Lim}$ is formed in the comparison unit CU2 from the greater of these two values for the difference torque $Tq_{diff}$ and for the maximum difference torque $Tq_{diff,max}$.

Instead of considering the pre-injected and post-injected fuel masses $m_{fuel,pre}$, $m_{fuel,post}$ with a factor ($F_{eff}$(phase,$\lambda$); cf. FIG. 3), it is equally possible and effective to calculate the current torque separately for each of the three aforementioned components (pre-injection, main injection, post-injection) and then to totalize these values:

$$Tq_{current,tot}=\Sigma(Tq_{current,pre}+Tq_{current,main}+Tq_{current,post}),$$

where the mathematical model according to FIG. 3 is modified to the effect that, in the factor $F_{eff}$(phase,$\lambda$), consideration is only given to that fuel share for which the torque effect is to be calculated.

The invention is not limited in its execution to the preferred exemplary embodiments described above. On the contrary, it is possible to conceive a plurality of variants which utilize the solution represented, even though their embodiment may be fundamentally different.

What is claimed is:

1. A method for controlling an internal combustion engine having a fuel-injection system, wherein each fuel injection pulse for a combustion chamber during a working stroke is configured to include at least one additional quantity of pre-injected and/or at least one quantity of post-injected fuel in addition to a main injection quantity at an intended injection instant, comprising:

assigning a control system to the internal combustion engine, the control system comprising:

a pedal value sensor (106) for capturing a current accelerator pedal value ($V_{FP}$), and a rotational speed sensor for capturing a current rotational speed of the internal combustion engine;

determining a preferred torque for the clutch-side end of a crankshaft from the accelerator pedal value and from the rotational speed; and deriving at least one actuating signal for at least one actuator of the internal combustion engine from the preferred torque, wherein during a pre-injected fuel mass which is supplied to the combustion chamber at an earlier instant than a main-injection mass, a correction to the torque-determining total fuel mass performed, wherein a value for a time or phase difference between injection start or injection end of the pre-injection and injection start or injection end of the main injection is taken into consideration in an assigned correction factor, and during a post-injected fuel mass which is supplied to the combustion chamber at a later instant than the main-injection mass, a correction to the torque-determining total fuel mass performed, wherein a value for a time or phase difference between injection start or injection end of the main injection and injection start or injection end of the post-injection is taken into consideration in an assigned correction factors.

2. The method as claimed in claim 1, wherein a current value for an air mass flow is additionally captured in the control system which is assigned to the internal combustion engine.

3. The method as claimed in claim 1, wherein that a current value for a fuel mass flow is additionally determined or derived in the control system which is assigned to the internal combustion engine.

4. The method as claimed in claim 1, wherein at least a regulating value of a torque-requiring regulating unit is additionally taken into consideration for determining the preferred torque for the clutch-side end of the crankshaft.

5. The method as claimed in claim 4, wherein a regulating value of a travel speed regulator and/or a preferred torque of an ESP system and/or a preferred torque of an ASR system is taken into consideration for determining the preferred torque for the clutch-side end of the crankshafts.

6. The method as claimed in claim 1, wherein the preferred torque is determined by an assignment rule from at least one characteristic map.

7. The method as claimed in claim 1, wherein an overall ratio of air and fuel per working stroke is taken into consideration for the correction of the determined total fuel mass.

8. The method as claimed in claim 7, wherein the correction of the determined total fuel mass is determined by an assignment rule from at least one characteristic map.

9. The method as claimed in claim 1, wherein the correction factor, which comprises the sum of three factors is taken into consideration for calculating a current torque, where:

$$F_{eff}=f_1(m_{fuel,main})+f_2(m_{fuel,pre})*\eta_2(\text{phase}_{pre-main})+f_3(m_{fuel,post})*\eta_3(\text{phase}_{main-post}).$$

10. The method as claimed in claim 1, wherein the correction factor is taken into consideration for calculating a current torque, where:

$$F_{eff}=f_1(m_{fuel,main})+f_2(m_{fuel,pre})*\eta_2(\text{phase}_{pre-main},\lambda)+f_3(m_{fuel,post})*\eta_3(\text{phase}_{main-post},\lambda).$$

* * * * *